(12) United States Patent
Skvortsov et al.

(10) Patent No.: US 9,313,113 B2
(45) Date of Patent: Apr. 12, 2016

(54) DETERMINING UNIQUE VISTORS TO A NETWORK LOCATION

(71) Applicant: Google Inc., Mountain View, CA (US)

(72) Inventors: Evgeny Skvortsov, Bellevue, WA (US); Carl Fredrik Hubinette, Bothell, WA (US); Taylan Yildiz, Palo Alto, CA (US); Lu Zhang, Kirkland, WA (US)

(73) Assignee: Google Inc., Mountain View, CA (US)

( * ) Notice: Subject to any disclaimer, the term of this patent is extended or adjusted under 35 U.S.C. 154(b) by 345 days.

(21) Appl. No.: 14/050,569

(22) Filed: Oct. 10, 2013

(65) Prior Publication Data

US 2014/0040463 A1  Feb. 6, 2014

Related U.S. Application Data

(63) Continuation of application No. PCT/US2012/033330, filed on Apr. 12, 2012.

(60) Provisional application No. 61/474,552, filed on Apr. 12, 2011.

(51) Int. Cl.
*H04L 12/26* (2006.01)
*G06F 17/30* (2006.01)

(52) U.S. Cl.
CPC ...... *H04L 43/0876* (2013.01); *G06F 17/30861* (2013.01)

(58) Field of Classification Search
CPC .................................................. H04L 43/0876
See application file for complete search history.

(56) References Cited

U.S. PATENT DOCUMENTS

| 8,386,599 | B2 | 2/2013 | Fomitchev | |
|---|---|---|---|---|
| 2010/0228850 | A1 | 9/2010 | Fomitchev | |
| 2011/0055216 | A1* | 3/2011 | Weinroth | H04W 24/08 707/740 |
| 2011/0161362 | A1* | 6/2011 | Lipscombe | G06F 17/30011 707/769 |
| 2011/0225288 | A1* | 9/2011 | Easterday | G06F 17/30306 709/224 |

OTHER PUBLICATIONS

Fomitchev, "How Google Analytics and Conventional Cookie Tracking Techniques Overestimate Unique Visitors", Apr. 26-30, 2010, ACM, p. 1093-1094, 2 pages.*
PCT International Search Report and Written Opinion dated Oct. 19, 2012 for PCT International Application No. PCT/US2012/033330 (8 pages).

* cited by examiner

*Primary Examiner* — Brian J Gillis
*Assistant Examiner* — Amy Ling
(74) *Attorney, Agent, or Firm* — Fish & Richardson P.C.

(57) ABSTRACT

A system and computer-implemented method for determining an estimated number of unique visitors to a network location from a geographical area. A non-linear approximation is utilized to determine the estimated number of unique visitors to the network location. The non-linear approximation is based on at least the estimated number of users within the geographical area, the estimated number of unique user identifiers within the geographical area, and the number of unique user identifiers from the geographical area that are observed at the network location.

40 Claims, 8 Drawing Sheets

DETERMINING UNIQUE VISTORS TO A NETWORK LOCATION

CROSS-REFERENCE TO RELATED APPLICATION

This application is a continuation of International Application No. PCT/US2012/033330, filed on Apr. 12, 2012 which application claims the benefit of U.S. Provisional Application No. 61/474,552, filed on Apr. 12, 2011. The entire disclosure of each of the above applications is incorporated herein by reference.

FIELD

The present disclosure generally relates to information management and, more particularly, to a system and method for determining the number of unique visitors to a network location, e.g., a webpage or collection of webpages.

BACKGROUND

This section provides background information related to the present disclosure which is not necessarily prior art.

The number of unique visitors to a network location as well as information relating to those users (demographic information, etc.) may be utilized in many ways. A network location, such as a webpage, streaming media source, networked application or mobile or embedded device may seek to estimate its number of unique visitors indirectly, while protecting the privacy of individual user information.

SUMMARY

This section provides a general summary of the disclosure, and is not a comprehensive disclosure of its full scope or all of its features.

In various embodiments of the present disclosure, a computer-implemented method is disclosed. The method includes obtaining, at an estimation server, an estimated number of users of a network within a geographical area, an estimated number of unique user identifiers within the geographical area, and a number of unique user identifiers from the geographical area that are observed at a network location in the network. The method further includes determining, at the estimation server, an estimated number of unique visitors to the network location from the geographical area utilizing a non-linear approximation based on at least the estimated number of users within the geographical area, the estimated number of unique user identifiers within the geographical area, and the number of unique user identifiers from the geographical area that are observed at the network location. The method also includes storing, on a memory at the estimation server, the estimated number of unique visitors to the network location from the geographical area.

In various embodiments of the present disclosure, a system that includes one or more processors at an estimation server operable to perform a number of operations is disclosed. The operations include obtaining an estimated number of users of a network within a geographical area, obtaining an estimated number of unique user identifiers within the geographical area and obtaining a number of unique user identifiers from the geographical area that are observed at a network location in the network. The operations further include determining an estimated number of unique visitors to the network location from the geographical area utilizing a non-linear approximation based on at least the estimated number of users within the geographical area, the estimated number of unique user identifiers within the geographical area, and the number of unique user identifiers from the geographical area that are observed at the network location. The operations also include storing, on a memory at the estimation server, the estimated number of unique visitors to the network location from the geographical area.

In various embodiments of the present disclosure, a computer-readable storage medium having instructions stored thereon, which, when executed by a processor at an estimation server, causes the processor to perform operations, is disclosed. The operations include obtaining an estimated number of users of a network within a geographical area, obtaining an estimated number of unique user identifiers within the geographical area, and obtaining a number of unique user identifiers from the geographical area that are observed at a network location in the network. The operations further include determining an estimated number of unique visitors to the network location from the geographical area utilizing a non-linear approximation based on at least the estimated number of users within the geographical area, the estimated number of unique user identifiers within the geographical area, and the number of unique user identifiers from the geographical area that are observed at the network location. The operations also include storing, on a memory at the estimation server, the estimated number of unique visitors to the network location from the geographical area.

In various embodiments of the present disclosure, another computer-implemented method is disclosed. The method includes obtaining, at an estimation server, a plurality of demographic categories corresponding to users of a network within a geographical area. The method further includes, for at least one demographic category of the plurality of demographic categories: (1) obtaining, at the estimation server, an estimated number of users within the geographical area and within the demographic category, (2) obtaining, at the estimation server, an estimated number of unique user identifiers within the geographical area and within the demographic category, (3) obtaining, at the estimation server, a number of unique user identifiers from the geographical area and within the demographic category that are observed at a network location in the network, (4) determining, at the estimation server, an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location, and (5) storing, on a memory at the estimation server, the estimated number of unique visitors to the network location from the geographical area.

In various embodiments of the present disclosure, another system that includes one or more processors at an estimation server operable to perform a number of operations is disclosed. The operations include obtaining a plurality of demographic categories corresponding to users of a network within a geographical area. The operations further include, for at least one demographic category of the plurality of demographic categories: (1) obtaining an estimated number of users within the geographical area and within the demographic category, (2) obtaining an estimated number of unique user identifiers within the geographical area and within the demographic category, (3) obtaining a number of unique user identifiers from the geographical area and within the demographic category that are observed at a network location in the network, (4) determining an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location, and (5) storing on a memory at the estimation server the estimated number of unique visitors to the network location from the geographical area.

In various embodiments of the present disclosure, another computer-readable storage medium having instructions stored thereon, which, when executed by a processor at an estimation server, causes the processor to perform operations, is disclosed. The operations include obtaining a plurality of demographic categories corresponding to users of a network within a geographical area. The operations further include, for at least one demographic category of the plurality of demographic categories: (1) obtaining an estimated number of users within the geographical area and within the demographic category, (2) obtaining an estimated number of unique user identifiers within the geographical area and within the demographic category, (3) obtaining a number of unique user identifiers from the geographical area and within the demographic category that are observed at a network location in the network, (4) determining an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location, (5) storing on a memory at the estimation server the estimated number of unique visitors to the network location from the geographical area.

In various embodiments of the present disclosure, another computer-implemented method is disclosed. The method includes obtaining, at an estimation server, a plurality of demographic categories corresponding to users of a network within a geographical area. The method further includes, for each demographic category of the plurality of demographic categories: (1) obtaining, at the estimation server, an estimated number of users within the geographical area and within the demographic category, (2) obtaining, at the estimation server, a plurality of unique user identifiers within the geographical area and within the demographic category, (3) obtaining, at the estimation server, a first distribution of a number of unique user identifiers per user within the geographical area and within the demographic category, (4) creating, at the estimation server, a set of pseudo-users within the geographical area and within the demographic category, wherein the set of pseudo-users includes a number of pseudo-users approximately equal to the estimated number of users within the geographical area and within the demographic category, (5) at the estimation server, assigning to each pseudo-user within the set of pseudo-users at least one of the unique user identifiers within the geographical area and within the demographic category to create a second distribution of a number of unique user identifiers per pseudo-user that approximates the first distribution such that each of the plurality of unique user identifiers within the geographical area and within the demographic category is assigned to a pseudo-user within the set of pseudo-users, and (6) storing on a memory at the estimation server the estimated number of unique visitors to the network location from the geographical area.

In various embodiments of the present disclosure, another system that includes one or more processors at an estimation server operable to perform a number of operations is disclosed. The operations include obtaining a plurality of demographic categories corresponding to users of a network within a geographical area. The operations further include, for each demographic category of the plurality of demographic categories: (1) obtaining an estimated number of users within the geographical area and within the demographic category, (2) obtaining a plurality of unique user identifiers within the geographical area and within the demographic category, (3) obtaining a first distribution of a number of unique user identifiers per user within the geographical area and within the demographic category, (4) creating a set of pseudo-users within the geographical area and within the demographic category, wherein the set of pseudo-users includes a number of pseudo-users approximately equal to the estimated number of users within the geographical area and within the demographic category, (5) assigning to each pseudo-user within the set of pseudo-users at least one of the unique user identifiers within the geographical area and within the demographic category to create a second distribution of a number of unique user identifiers per pseudo-user that approximates the first distribution such that each of the plurality of unique user identifiers within the geographical area and within the demographic category is assigned to a pseudo-user within the set of pseudo-users, and (6) storing on a memory at the estimation server the estimated number of unique visitors to the network location from the geographical area.

In various embodiments of the present disclosure, another computer-readable storage medium having instructions stored thereon, which, when executed by a processor at an estimation server, causes the processor to perform operations, is disclosed. The operations include obtaining a plurality of demographic categories corresponding to users of a network within a geographical area. The operations further include, for each demographic category of the plurality of demographic categories: (1) obtaining an estimated number of users within the geographical area and within the demographic category, (2) obtaining a plurality of unique user identifiers within the geographical area and within the demographic category, (3) obtaining a first distribution of a number of unique user identifiers per user within the geographical area and within the demographic category, (4) creating a set of pseudo-users within the geographical area and within the demographic category, wherein the set of pseudo-users includes a number of pseudo-users approximately equal to the estimated number of users within the geographical area and within the demographic category, (5) assigning to each pseudo-user within the set of pseudo-users at least one of the unique user identifiers within the geographical area and within the demographic category to create a second distribution of a number of unique user identifiers per pseudo-user that approximates the first distribution such that each of the plurality of unique user identifiers within the geographical area and within the demographic category is assigned to a pseudo-user within the set of pseudo-users, and (6) storing on a memory at the estimation server the estimated number of unique visitors to the network location from the geographical area.

In various embodiments of the present disclosure, another computer-implemented method is disclosed. The method includes obtaining, at an estimation server, a plurality of demographic categories corresponding to users of a network within a geographical area. The method further includes generating, at the estimation server, a plurality of sets of pseudo-users by, for each demographic category of the plurality of demographic categories: (1) obtaining, at the estimation server, an estimated number of users within the geographical area and within the demographic category, (2) obtaining, at the estimation server, a plurality of unique user identifiers within the geographical area and within the demographic category, (3) creating, at the estimation server, a set of pseudo-users within the geographical area and within the demographic category, wherein the set of pseudo-users includes a number of pseudo-users approximately equal to the estimated number of users within the geographical area and within the demographic category, and (4) at the estimation server, assigning to each pseudo-user of the set of pseudo-users at least one of the unique user identifiers within the geographical area and within the demographic category such that each of the plurality of unique user identifiers within the geographical area and within the demographic category is assigned to a pseudo-user within the set of pseudo-users. The method also includes utilizing the plurality of sets of pseudo-users to determine an estimated number of unique visitors to a network location in the network from the geographical area and storing on a memory at the estimation server the estimated number of unique visitors to the network location from the geographical area.

In various embodiments of the present disclosure, another system that includes one or more processors at an estimation server operable to perform a number of operations is disclosed. The operations include obtaining a plurality of demographic categories corresponding to users of a network within a geographical area. The operations further include generating a plurality of sets of pseudo-users by, for each demographic category of the plurality of demographic categories: (1) obtaining an estimated number of users within the geographical area and within the demographic category, (2) obtaining a plurality of unique user identifiers within the geographical area and within the demographic category, (3) creating a set of pseudo-users within the geographical area and within the demographic category, wherein the set of pseudo-users includes a number of pseudo-users approximately equal to the estimated number of users within the geographical area and within the demographic category, and (4) assigning to each pseudo-user of the set of pseudo-users at least one of the unique user identifiers within the geographical area and within the demographic category such that each of the plurality of unique user identifiers within the geographical area and within the demographic category is assigned to a pseudo-user within the set of pseudo-users. The operations also include utilizing the plurality of sets of pseudo-users to determine an estimated number of unique visitors to a network location in the network from the geographical area and storing on a memory at the estimation server the estimated number of unique visitors to the network location from the geographical area.

In various embodiments of the present disclosure, another computer-readable storage medium having instructions stored thereon, which, when executed by a processor at an estimation server, causes the processor to perform operations, is disclosed. The operations include obtaining a plurality of demographic categories corresponding to users of a network within a geographical area. The operations further include generating a plurality of sets of pseudo-users by, for each demographic category of the plurality of demographic categories: (1) obtaining an estimated number of users within the geographical area and within the demographic category, (2) obtaining a plurality of unique user identifiers within the geographical area and within the demographic category, (3) creating a set of pseudo-users within the geographical area and within the demographic category, wherein the set of pseudo-users includes a number of pseudo-users approximately equal to the estimated number of users within the geographical area and within the demographic category, and (4) assigning to each pseudo-user of the set of pseudo-users at least one of the unique user identifiers within the geographical area and within the demographic category such that each of the plurality of unique user identifiers within the geographical area and within the demographic category is assigned to a pseudo-user within the set of pseudo-users. The operations also include utilizing the plurality of sets of pseudo-users to determine an estimated number of unique visitors to a network location in the network from the geographical area and storing on a memory at the estimation server the estimated number of unique visitors to the network location from the geographical area.

In various embodiments of the present disclosure, another computer-implemented method is disclosed. The method includes obtaining, at an estimation server, a plurality of demographic categories corresponding to users of a network within a geographical area. The method further includes generating, at the estimation server, a plurality of sets of pseudo-users by, for each demographic category of the plurality of demographic categories: (1) obtaining, at the estimation server, an estimated number of users within the geographical area and within the demographic category, (2) obtaining, at the estimation server, a plurality of unique user identifiers within the geographical area and within the demographic category, (3) creating, at the estimation server, a set of pseudo-users within the geographical area and within the demographic category, wherein the set of pseudo-users includes a number of pseudo-users approximately equal to the estimated number of users within the geographical area and within the demographic category, and (4) at the estimation server, assigning to each pseudo-user of the set of pseudo-users at least one of the unique user identifiers within the geographical area and within the demographic category such that each of the plurality of unique user identifiers within the geographical area and within the demographic category is assigned to a pseudo-user within the set of pseudo-users. The method also includes utilizing the plurality of sets of pseudo-users to determine an estimated number of unique visitors to a network location in the network from the geographical area and within at least one demographic category and storing on a memory at the estimation server the estimated number of unique visitors to the network location from the geographical area.

In various embodiments of the present disclosure, another system that includes one or more processors at an estimation server operable to perform a number of operations is disclosed. The operations include obtaining a plurality of demographic categories corresponding to users of a network within a geographical area. The operations further include generating a plurality of sets of pseudo-users by, for each demographic category of the plurality of demographic categories: (1) obtaining an estimated number of users within the geographical area and within the demographic category, (2) obtaining a plurality of unique user identifiers within the geographical area and within the demographic category, (3) creating a set of pseudo-users within the geographical area and within the demographic category, wherein the set of pseudo-users includes a number of pseudo-users approximately equal to the estimated number of users within the geographical area and within the demographic category, and (4) assigning to each pseudo-user of the set of pseudo-users at least one of the unique user identifiers within the geographical area and within the demographic category such that each of the plurality of unique user identifiers within the geographical area and within the demographic category is assigned to a pseudo-user within the set of pseudo-users. The operations also include utilizing the plurality of sets of pseudo-users to determine an estimated number of unique visitors to a network location in the network from the geographical area and within at least one demographic category and storing on a memory at the estimation server the estimated number of unique visitors to the network location from the geographical area.

In various embodiments of the present disclosure, another computer-readable storage medium having instructions stored thereon, which, when executed by a processor at an estimation server, causes the processor to perform operations, is disclosed. The operations include obtaining a plurality of demographic categories corresponding to users of a network within a geographical area. The operations further include generating a plurality of sets of pseudo-users by, for each demographic category of the plurality of demographic categories: (1) obtaining an estimated number of users within the geographical area and within the demographic category, (2) obtaining a plurality of unique user identifiers within the geographical area and within the demographic category, (3) creating a set of pseudo-users within the geographical area and within the demographic category, wherein the set of pseudo-users includes a number of pseudo-users approximately equal to the estimated number of users within the geographical area and within the demographic category, and (4) assigning to each pseudo-user of the set of pseudo-users at least one of the unique user identifiers within the geographical area and within the demographic category such that each of the plurality of unique user identifiers within the geographical area and within the demographic category is assigned to a pseudo-user within the set of pseudo-users. The operations also include utilizing the plurality of sets of pseudo-users to determine an estimated number of unique visitors to a network location in the network from the geographical area and within at least one demographic category and storing on a memory at the estimation server the estimated number of unique visitors to the network location from the geographical area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
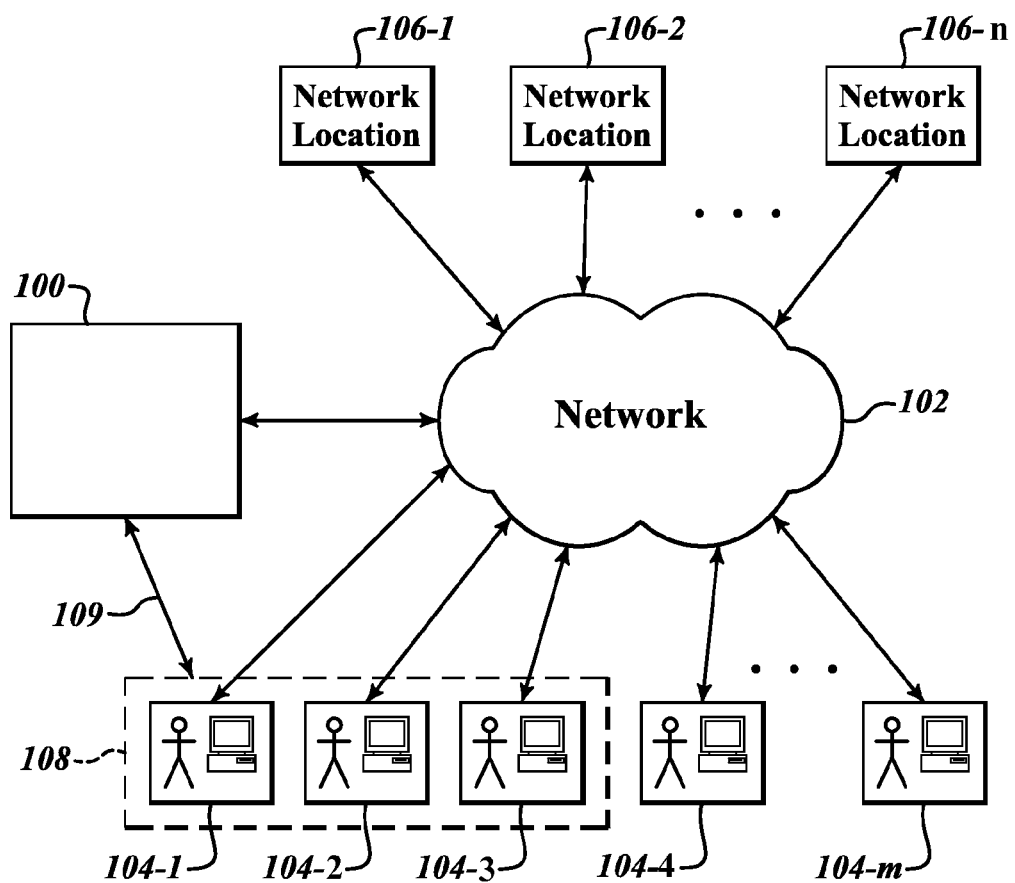
FIG. 1 is a block diagram of an example system for determining the number of unique visitors to a network location in a network.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a computer-readable storage medium, such as a non-transitory tangible computer-readable medium. The computer programs may also include stored data. Non-limiting examples of the computer readable storage medium are nonvolatile memory, magnetic storage, and optical storage.

Referring now to FIG. 1, an example system 100 for determining the number of unique visitors to a network location is illustrated. The system 100 is connected to a network 102, e.g., a local network, a wide-area network such as the Internet, or a combination thereof. A plurality of individual users 104-1, 104-2 . . . 104-$m$ (collectively, users 104) are connected via the network 102 to a plurality of individual network locations 106-1, 106-2 . . . 106-$n$ (collectively, network locations 106). Users 104 access content from, or "visit," the network locations 106 through the network 102. Examples of network locations 106 include, but are not limited to, webpages, a collection of webpages, networked applications, streaming media sources, networked devices (mobile devices, embedded devices, etc.) and other network resources. As used herein, the term "user" 104 may refer to not only individual users, but also other entities such as a group of individuals, e.g., individuals that behave or otherwise act as an individual unit.

Figure 2:
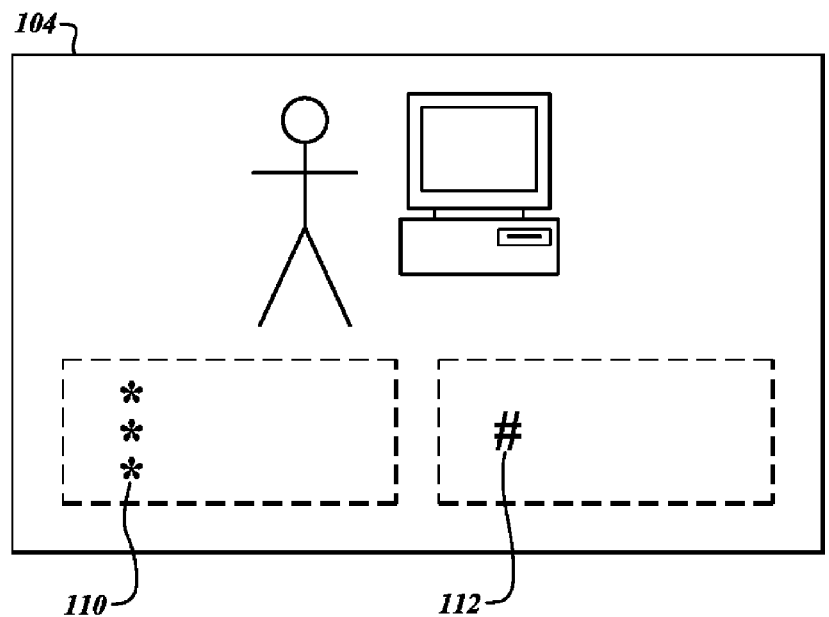
FIG. 2 is a block diagram of an example user of a network.

As a user 104 visits one or more network locations 106, the user 104 may acquire user identifiers 110 (FIG. 2), such as cookies (browser, flash local stored objects, HTML5 storage or otherwise), application local storage, identity tokens such as a kerberized ticket federated identity system token, a mobile key representative of user identity, or the like, which may be in part or in whole stored at the location of the user 104, for example, in memory at the user's 104 computing device (personal computer, laptop, smart phone, etc.). Optionally, a user identifier 110 may include demographic information 112 or other information related to the particular user 104 to which it belongs, such as, for example, a particular device or network address. Demographic information 112 as used herein includes any information in which one or more users 104 can be grouped (age, income level, sex, topics of interest, etc.). Each of the users 104 may obtain many user identifiers 110. As a user 104 visits a particular network location 106, the network location 106 can observe the user identifiers 110 stored at the user 104 location. The particular network location 106 may only be able to access user identifiers 110 associated with the network location 106 itself, and not those associated with other, non-affiliated network locations 106. A user identifier 110 may be related to one or more network locations 106 directly, through a federated identity system, or through a user network. These user identifiers 110 may be utilized by the system 100 to accurately estimate the number of unique visitors to the network location 106, i.e., the number of unique users 104 that have accessed information from or "visited" the network location 106, as described below. Preferably, the network location 106 may employ one or more methodologies to protect the privacy of the user 104 and user identifier 110, including but not limited to privacy policies, pseudo-anonymization and masking of user data, restrictions on associations between demographic data and a user, encryption and hashing of user data, deletion of data after time windows, aggregation of non-individual user data, and restrictions on sharing of user data.

The number of visits (or "page views") to a network location 106 can be measured directly, e.g., by the network location 106. The number of unique visitors to the network location 106, however, in some instances cannot be measured directly, as well as the fact that a single user 104 may visit a network location 106 multiple times and/or from multiple IP addresses, a single user 104 may be associated with multiple unique user identifiers 110, multiple users 104 may visit a network location 106 from the same IP address, etc. Thus, the number of unique visitors to a network location 106 where direct measurement is impossible/impractical may have to be indirectly estimated by utilizing an item or object that can be directly measured and correlated to the number of unique visitors. In some implementations, the number of unique user identifiers 110 observed at a network location 106 can be utilized to accurately estimate the number of unique visitors to the network location 106.

Figure 3:
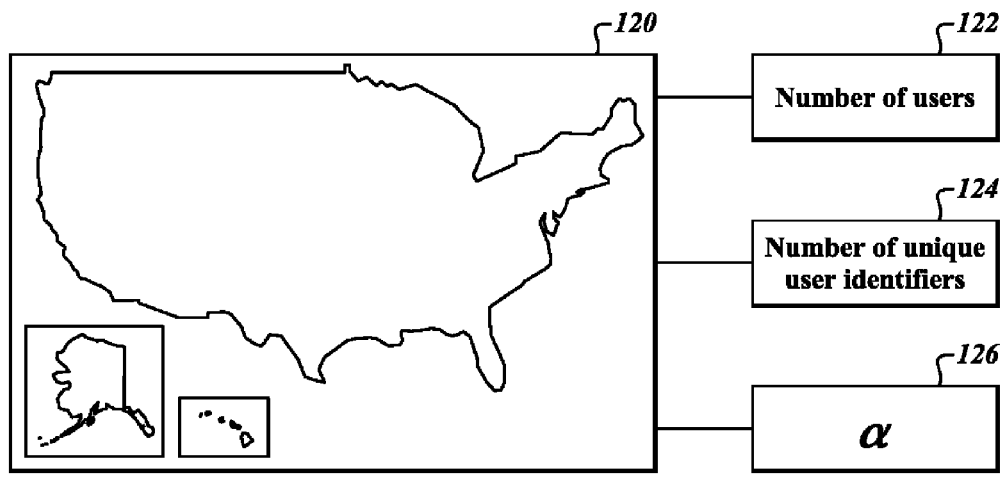
FIG. 3 is a block diagram of an example geographical area and associated statistical factors.

Referring now to FIG. 3, a representation of an example geographical area 120 and its associated factors is shown. In this example, the geographical area 120 represented is the United States of America, although one skilled in the art will appreciate that any geographical area 120 or sub-area (such as, for example, a geographic boundary, legal boundary, demographic boundary, zip code, or a geographic boundary extrapolated from user usage patterns) could be utilized. Based on data gathered from, e.g., voluntary/anonymously provided browsing data, census data and/or other data sources, the estimated total number of users 122 of the network 102 for the geographical area 120, as well as the total number of unique user identifiers 124 for geographical area 120, are known or can be determined, e.g., by statistical or other analysis. Further, a parameter $\alpha$ 126 that is specific to the geographical area 120 is associated with the geographical area 120. As described below, the geographical area-specific parameter $\alpha$ 126 can be determined by non-linear approximation or by analysis of data provided, e.g., by a virtual panel 108 of users 104. Based on these factors, the number of unique visitors from the geographical area 120 to a network location 106 can be estimated, as more fully described below.

In some embodiments of the present disclosure, a non-linear approximation is utilized to estimate the number of unique visitors to a network location 106, i.e., the number of unique users 104, from a geographical area 120, to visit the network location 106. In addition to the number of unique user identifiers 110 observed at a network location 106, the non-linear approximation utilizes a number of other factors, for example, the total number of users 122 within a geographical area 120, as well as the total number of unique user identifiers 124 within a geographical area 120. It has been determined that these factors can be utilized with a 1-parameter approximation to provide an accurate estimation of unique visitors to a network location 106 from a geographical area 120. The parameter, represented by a, is specific to the geographical area 120 of interest and can be derived in various ways, as described below.

In some embodiments, the non-linear approximation utilizes the equation:

$$\# \text{ people} = \frac{(1+\alpha)\# \text{ cookies}}{\alpha c + \# \text{ cookies}} \cdot p, \quad (1)$$

wherein "# people" is the estimated number of unique visitors to the network location 106 from the geographical area 120; "# cookies" is the number of unique user identifiers 110 (recognizing that the user identifier 110 may be other than a cookie) from the geographical area 120 that are observed at the network location 106; "c" is the estimated total number of unique user identifiers 124 within the geographical area 120; "p" is the estimated total number of users 122 of the network 102 within the geographical area 120; and "α" is a parameter 126 of the approximation specific to the geographical area 120.

In some embodiments, the system 100 utilizes information gathered from a "virtual panel" 108 of users 104 (FIG. 1) within a geographical area 120 to determine a value for the parameter α 126 within that geographical area 120. A virtual panel 108 may communicate with the system 100 over a direct communication link 109, through network 102, or both. A virtual panel 108 includes users 104 that use one or more application programs that provide page link analysis browser request data, which can be used to infer demographics for users' web browsing history data while preserving the privacy of individual users and their browsing history. Page link analysis browser request data can include the webpage browsing history of a user 104, such as the identity of webpages visited, and other data associated with the user 104 and the network locations 106 visited by the user 104. An example virtual panel 108 can provide information such as the number of unique visitors to a particular network location. Examples of virtual panels 108 include, but are not limited to, browsing data or web usage data, such as, for example, usage data that is voluntarily provided on an opt-in basis, is anonymously provided, and the like. One should note, however, that browsing data does not necessarily equate to unique visitors to a network location. It will be appreciated, however, that other methods of gathering data can also be used. The virtual panel 108 can include a large number (e.g., thousands or millions) of users 104, allowing the system 100 to determine the appropriate value for the parameter α 126. Users 104 can also have privacy preserved through the application programs obfuscation of individually identifying information or other personal information voluntarily contributed, through the introduction of noise into web browser logs, or through other privacy protecting mechanisms.

In various alternative embodiments, for example for geographical areas 120 in which sufficient, accurate information from a virtual panel 108 of users 104 is unavailable, the system 100 can derive an appropriate value for parameter α 126. For example, a non-linear approximation can be utilized to determine a value for parameter α 126. The non-linear approximation is based upon the estimated total number of users 122 within a geographical area 120, the estimated total number of unique user identifiers 124 within the geographical area 120 and a parameter β that is independent of the geographical area 120 of interest. In some embodiments, the non-linear approximation to determine parameter α 126 utilizes the equation:

$$\alpha = \frac{1}{(c/p)^\beta - 1}, \quad (2)$$

wherein "c" is the estimated total number of unique user identifiers 124 within the geographical area 120; "p" is the estimated total number of users 122 of the network 102 within the geographical area 120; and "β" is a parameter of the model independent of the geographical area 120, which, e.g., can be determined from data received from a virtual panel 108. It has been determined that β=0.75 to 0.9 provides an appropriate approximation of the parameter α 126, although other values of parameter β can be determined from virtual panel 108 or other forms of data gathering.

In some situations, sufficient and accurate information about the total number of unique user identifiers 124 within a specific geographical area 120 may be unavailable. In such geographical areas 120, the non-linear approximation can utilize the equation:

$$\# \text{ people} = \frac{(kp)\# \text{ cookies}}{[(k)\# \text{ cookies} + p]}, \quad (3)$$

wherein "# people" is the estimated number of unique visitors to the network location 106 from the geographical area 120; "# cookies" is the number of unique user identifiers 110 (recognizing that the user identifier 110 may be other than a cookie) from the geographical area 120 that are observed at the network location 106; "p" is the estimated total number of users 122 of the network 102 within the geographical area 120; and "k" is a parameter of the model independent of the geographical area 120 and is representative of the inverse of the number of unique user identifiers 124 per unique visitor to an appropriately sized network location 106. The parameter "k" can be determined from a virtual panel (such as virtual panel 108) or other forms of data gathering. It has been determined that network locations 106 of a relatively small size behave similarly and provide a relatively accurate value for the "k" parameter, which is typically approximately equal to 1. Based on this equation (3), the estimated number of unique visitors to the network location 106 from the geographical area 120 can be determined based on just the number of unique user identifiers 110 from the geographical area 120 that are observed at the network location 106 and the estimated total number of users 122 of the network 102 within the geographical area 120.

In some embodiments, it is useful to provide additional information (such as, demographic information 112) about the unique visitors to a network location 106, and/or provide the number of unique visitors from a demographic category or categories instead of a total number of unique visitors. In various embodiments, the system 100 applies the non-linear approximation described above to each of a plurality of demographic categories in order to estimate the number of unique visitors to the network location 106 from that demographic category. In some embodiments, the non-linear approximation utilizes the equation:

$$\# \text{people}(x) = \frac{(1+\alpha)\# \text{ cookies}(x)}{\alpha c(x) + \# \text{ cookies}(x)} \cdot p(x), \quad (4)$$

wherein "#people(x)" is the total estimated number of unique visitors to the network location 106 from the geographical area 120 within demographic category x; "#cookies(x)" is the number of unique user identifiers 110 from the geographical area 120 within demographic category x that are observed at the network location 106 (again recognizing that #cookies(x) may be a user identifier other than a cookie); "c(x)" is the estimated total number of unique user identifiers 110 within the geographical area 120 and within demographic category x; "p(x)" is the estimated total number of users 104 within the geographical area 120 and within demographic category x; and "α" is a parameter 126 of the approximation specific to the geographical area 120. As described above, the parameter α is a geographical area-dependent value determined from representative data, e.g., gathered by a virtual panel 108, or estimated by a non-linear approximation based upon the estimated total number of users 122 within a geographical area 120, the estimated total number of unique user identifiers 124 within a geographical area 120 and a parameter β that is independent of the geographical area 120 of interest.

As described above, sufficient and accurate information about the total number of unique user identifiers 124 within a specific geographical area 120 may be unavailable. Furthermore, sufficient and accurate information about the total number of unique user identifiers 124 within a specific geographical area 120 and within a specific demographic category may be unavailable. In such situations, the non-linear approximation expressed as equation (3) above can be modified to yield the equation:

$$\# \text{people}(x) = \frac{[kp(x)]\# \text{ cookies}(x)}{[k\# \text{ cookies}(x) + p(x)]}, \quad (5)$$

wherein "# people(x)" is the total estimated number of unique visitors to the network location 106 from the geographical area 120 within demographic category x; "# cookies(x)" is the number of unique user identifiers 110 from the geographical area 120 within demographic category x that are observed at the network location 106 (again recognizing that #cookies(x) may be a user identifier other than a cookie); "p(x)" is the estimated total number of users 104 within the geographical area 120 and within demographic category x; and "k" is a parameter of the model independent of the geographical area 120 and is representative of the inverse of the number of unique user identifiers 124 per unique visitor to an appropriately sized network location 106 (described more fully above).

For example only, let us suppose for each unique user identifier 110 one can determine the basic demographic information of associated users 104. The system 100 can then identify six independent demographic categories for the visitors: (1) males under 25, (2) males 25 to 45, (3) males over 45, (4) females under 25, (5) females 25 to 45, and (6) females over 45. In order to provide an estimate of the number of unique visitors from each of these demographic categories within the geographical area 120, the system 100 can apply a non-linear approximation (such as that above) to each of the demographic categories. If one wishes to know the number of unique visitors who are male, for example, the system 100 merely sums the estimations for demographic categories 1, 2 and 3 to determine this information. Additionally, the total number of unique visitors to the network location 106 is the sum of the estimations from all of the demographic categories.

While estimating the number of visitors within each demographic category by performing a non-linear approximation within each demographic category provides an accurate estimation of the number of visitors, the number of demographic categories, as well as the number of independent estimations, increases as the number of demographic categories and/or the level of gradation within each demographic category increases. To continue with the example above in which we had six demographic categories, one can see that the addition of an "income level" demographic category that had four levels (annual income (1) under $25K, (2) $25K to $49,999.99, (3) $50K to $74,999.99, and (4) $75K+) would result in twenty-four independent demographic categories, a fourfold increase in demographic categories. In order to provide rich data regarding the demographic information of visitors to a network location 106, it is conceivable to provide thousands of independent demographic categories. In response to a request to provide an estimate of the number of unique visitors to a network location 106, the non-linear approximation described above would need to be performed within each of the demographic categories and then summed. Performing the many independent non-linear approximations required by such a request, at the time of receipt of the request, may be undesirable or impractical, e.g., due to the delay associated with the performance of the computations and the increased physical resources (disk space, RAM, etc.) required.

Figure 4:
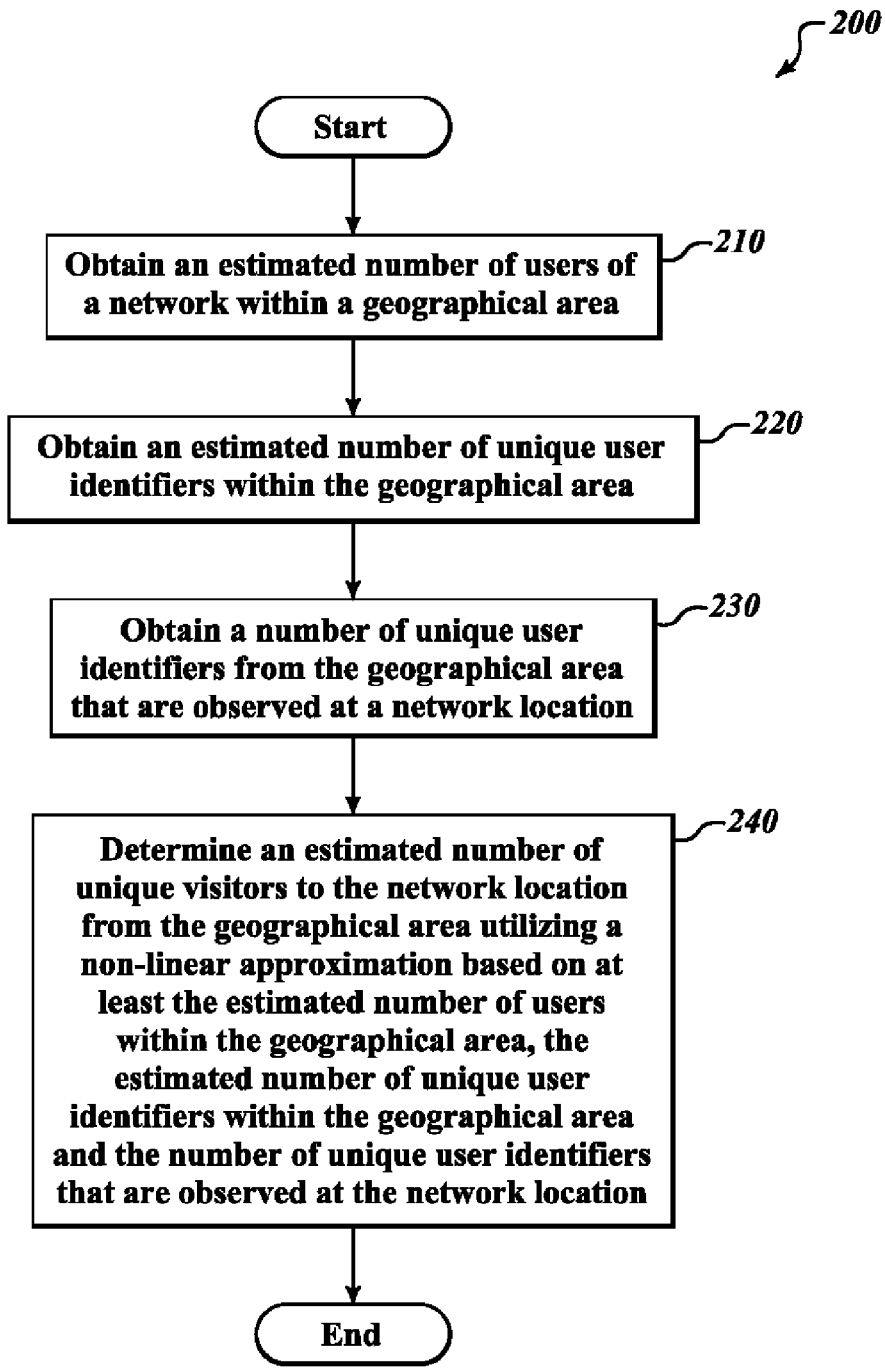
FIG. 4 is a flowchart of an example method of determining an estimated number of unique visitors to a network location from a geographical area.

Referring now to FIG. 4, a flowchart of an example method 200 of determining an estimated number of unique visitors to a network location 106 from a geographical area is shown. At step 210, an estimated total number of users 122 of the network 102 within the geographical area 120 is obtained, for example, at an estimation server 550. An estimated total number of unique user identifiers 124 within the geographical area 120 is obtained at the estimation server 550, at step 220. At step 230, the number of unique user identifiers 110 from the geographical area 120 that are observed at a network location 106 is obtained by the estimation server 550. The estimation server 550 then determines an estimated number of unique visitors to the network location 106 from the geographical area 120 utilizing a non-linear approximation based on at least the estimated total number of users 122 from the geographical area 120, the estimated total number of unique user identifiers 124 from the geographical area 120, and the number of unique user identifiers 110 from the geographical area 120 that are observed at a network location 106 (step 240).

The method 200 can be performed within one or more of a plurality of demographic categories to determine the estimated number of unique visitors to the network location 106 from the geographical area 120 within the one or more demographic categories. Further, each of the equations (1) to (4) described above could be utilized in conjunction with the non-linear approximation described in step 240.

Figure 5:
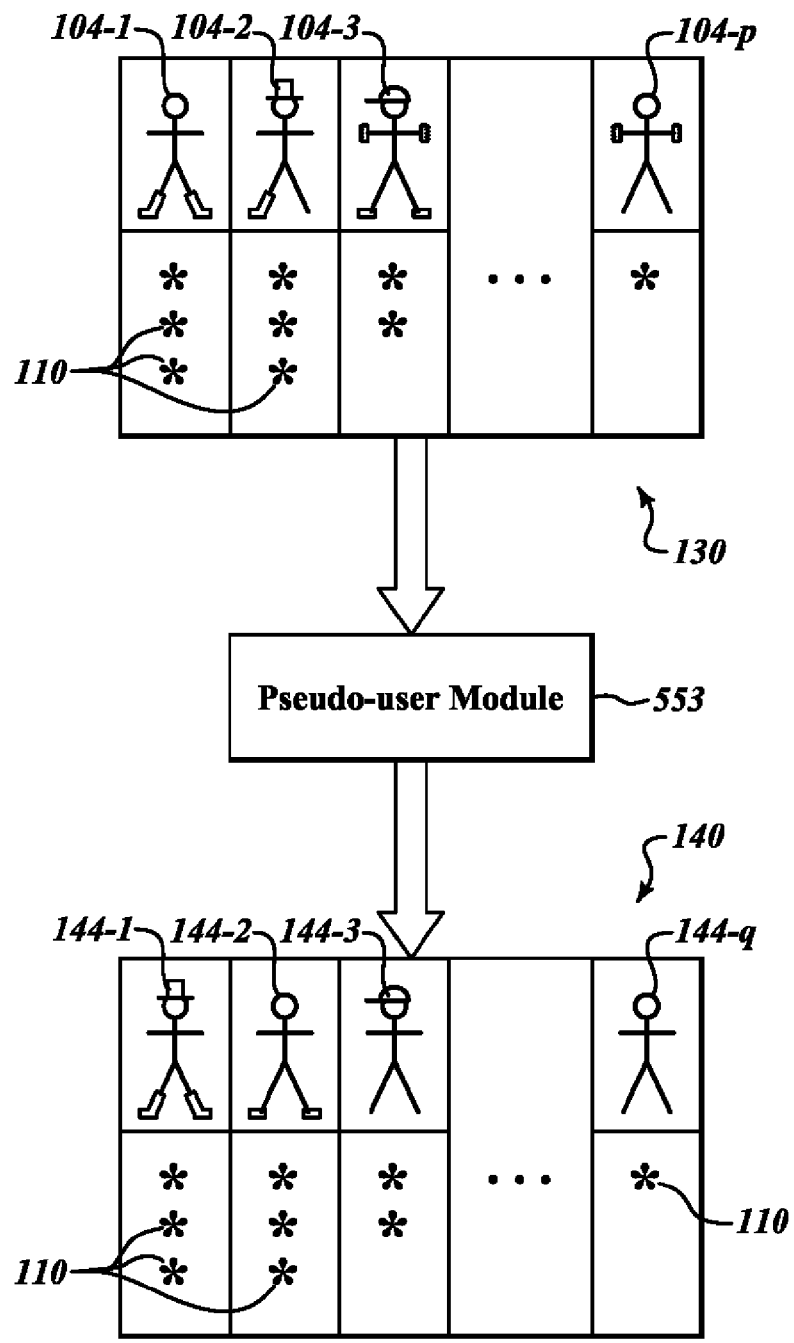
FIG. 5 is a block diagram of a pseudo-user module illustrating the creation of a set of pseudo-users from a plurality of users of a network.
Figure 6:
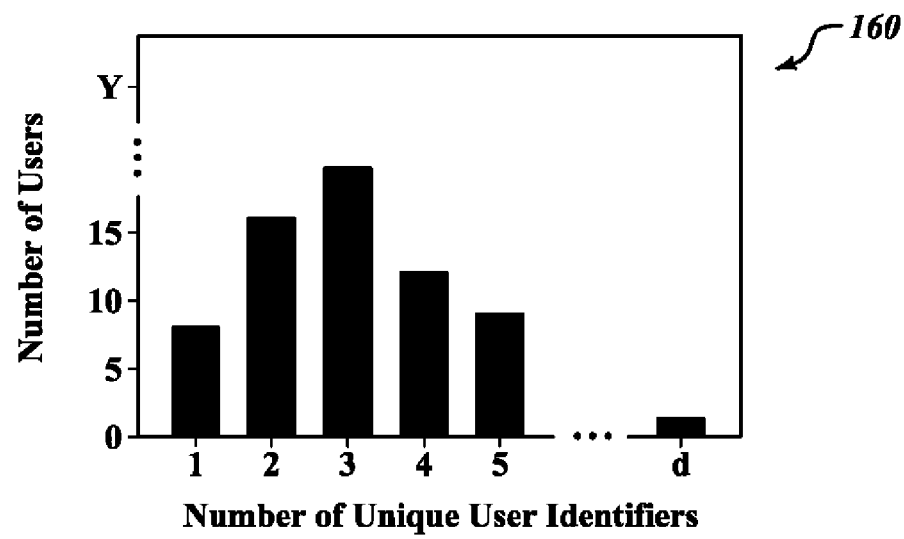
FIG. 6 is a block diagram illustrating a distribution of the number of users associated with a specific number of unique user identifiers.
Figure 7:
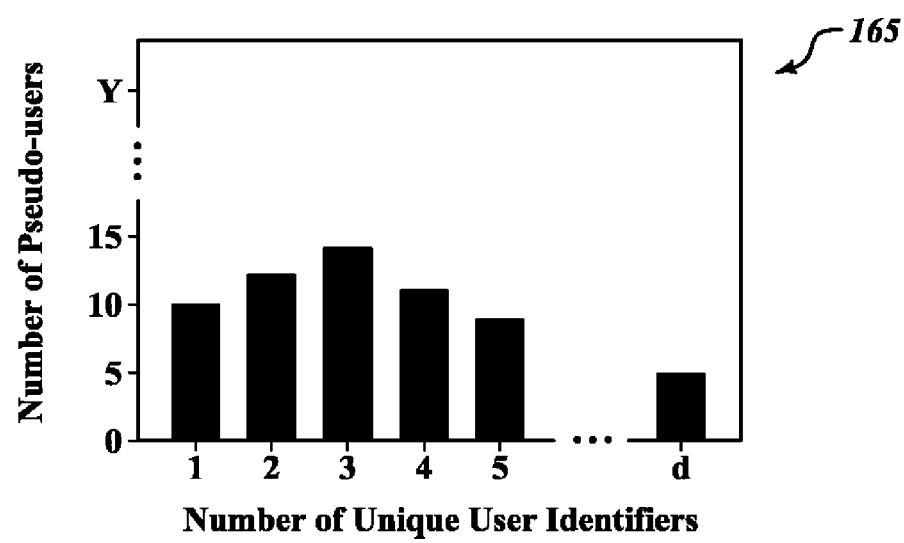
FIG. 7 is a block diagram illustrating a distribution of the number of pseudo-users associated with a specific number of unique user identifiers

Referring now to FIGS. 5-7, in various embodiments, the present disclosure provides for the creation of a set 140 of pseudo-users 144 within each demographic category that can be utilized to determine the number of unique visitors to a network location 106, as described below. By utilizing a set or set(s) 140 of pseudo-users 144, the delay associated with determining a response to a request to provide an estimate of the number of unique visitors to a network location 106 may be reduced.

The set 140 of pseudo-users 144 can be created by obtaining a first distribution 160 (FIG. 6) of a number of unique user identifiers 110 per user 104 for each demographic category within the geographical area 120. The first distribution 160 can be determined, e.g., by a virtual panel 108 or other data gathering technique. The set 140 of pseudo-users 144 is created based on the first distribution 160 and will include a number of pseudo-users 144 approximately equal to (+/−5-10%) the number of users 104 within the demographic category and within the geographical area 120.

Each pseudo-user 144 within the set 140 will be assigned at least one of the unique user identifiers 110 within the demographic category and within the geographical area 120. The assignment of unique user identifiers 110 to pseudo-users 144 may, for example, be performed uniformly at random, which can assist in preserving the privacy of the users 104 while also maintaining the ability of the system 100 to provide accurate estimations within one or more demographic categories. In some embodiments, each of the unique user identifiers 110 within the demographic category and within the geographical area 120 will be assigned to a pseudo-user 144.

The assignment of unique user identifiers 110 is performed to create a second distribution 165 (FIG. 7) of a number of unique user identifiers 110 per pseudo-user 144 for each demographic category within the geographical area 120. The second distribution 165 can be created to approximate the first distribution 160, that is, for any positive integer "d," the second distribution 165 will have a number of pseudo-users 144 that have been assigned "d" unique user identifiers 110 approximately equal to (+/−5-10%) the number of users 104 with "d" unique user identifiers 110 in the first distribution 160. In some embodiments, the second distribution 165 can be created to approximate the first distribution 160 after the first distribution 160 has been filtered to remove aberrant unique user identifiers 110, as described below.

In some embodiments, the assignment of unique user identifiers 110 to pseudo-users 144 is based on a non-linear approximation to create a second distribution 165 that approximates the first distribution 160. For example only, the non-linear approximation utilizes the equation:

$$h(k) = \frac{p\alpha}{(\alpha+1)^k}, \quad (6)$$

wherein "p" is the estimated total number of users 104 within the geographical area 120 and within the demographic category; "α" is a parameter specific to the geographical area 120; "k"=1 . . . d, where "d" is a positive integer; and "h(k)" is the number of pseudo-users 144 that have a number of unique user identifiers 110 equal to k. As described in detail above, the parameter α 126 may be determined from data received from a virtual panel 108 of users 104 or by non-linear approximation. The value of "d" can be determined based on data from the virtual panel 108 or other form of data gathering technique. Additionally, it has been determined that setting "d" equal to twelve is reasonable to provide a second distribution 165 that approximates the first distribution 160, e.g., for geographical areas 120 in which there is no data available from a virtual panel 108. In each case, the value for "d" is set such that, when the set 140 (or sets) of pseudo-users 144 is utilized to estimate the number of unique visitors to a network location 106, the estimated number of unique visitors to a network location 106 is approximately equal to (+/−5-10%) the actual number of unique visitors to that network location 106.

It has been determined, e.g., from analysis of data received from virtual panels 108 or other form of data gathering technique, that users 104 that have a number of unique user identifiers 110 equal to or greater than a threshold value can alter the creation of the sets 140 of pseudo-users 144 such that, when such an altered set 140 (or sets) of pseudo-users 144 is utilized to estimate the number of unique visitors to a network location 106, the estimated number of unique visitors to a network location 106 differs from the actual number of unique visitors to that network location 106. Because they differ from the "norm," these users 104, and their associated unique user identifiers 110, can be classified as aberrant data. In order to provide an accurate estimation of the number of unique visitors to a network location 106, these aberrant users 104 and/or aberrant unique user identifiers 110 can be filtered (or removed) before creation of the sets 140 of pseudo-users 144. In some embodiments, the threshold is equal to eight unique user identifiers 110, however any appropriate value for the threshold may be used, e.g., as determined by data from a virtual panel 108 or other form of data gathering technique.

A unique user identifier 110 can be defined as an aberrant unique user identifier 110 based on one or more factors. The data received from a virtual panel 108 or other data gathering technique may be analyzed, e.g., by a machine learning technique such as a support vector machine, to determine the factors by which an aberrant unique user identifier 110 can be identified. For example, a unique user identifier 110 can be classified as an aberrant unique user identifier 110 based on the age of the unique user identifier 110, the number of network locations 106 the unique user identifier 110 has visited, and/or the category(ies) (social, shopping, news, hobbies & leisure, etc.) of network locations 106 visited. It has been determined that a unique user identifier 110 that has been created relatively recently, i.e., has an age below an age threshold, is more likely to qualify as an aberrant unique user identifier 110. Further, a unique user identifier 110 that has visited a relatively small number of network locations 106, i.e, has visited a number of network locations 106 below a threshold number, is more likely to qualify as an aberrant unique user identifier 110. Additionally, the category(ies) of network locations 106 that the unique user identifier 110 has visited can assist in the definition of the unique user identifier 110 as an aberrant unique user identifier 110. For example only, it has been determined that a unique user identifier 110 is more likely to qualify as an aberrant unique user identifier 110 if the unique user identifier 110 has visited primarily "social" network locations.

The estimation server 550, for example, can determine the estimated number of unique visitors to a network location 106 from a geographical area 120 and within a demographic category by utilizing the sets 140 of pseudo-users 144. This can be accomplished by determining the number of pseudo-users 144, within the demographic category of interest, that were assigned at least one of the unique user identifiers 110 that are observed at the network location 106. Similarly, the estimated number of unique visitors to a network location 106 from a geographical area 120 and within a plurality of demographic categories can be determined by determining the number of pseudo-users 144, within each of the demographic categories of interest, that were assigned at least one of the unique user identifiers 110 that are observed at the network location 106 and then summing those numbers from each category.

Figure 8:
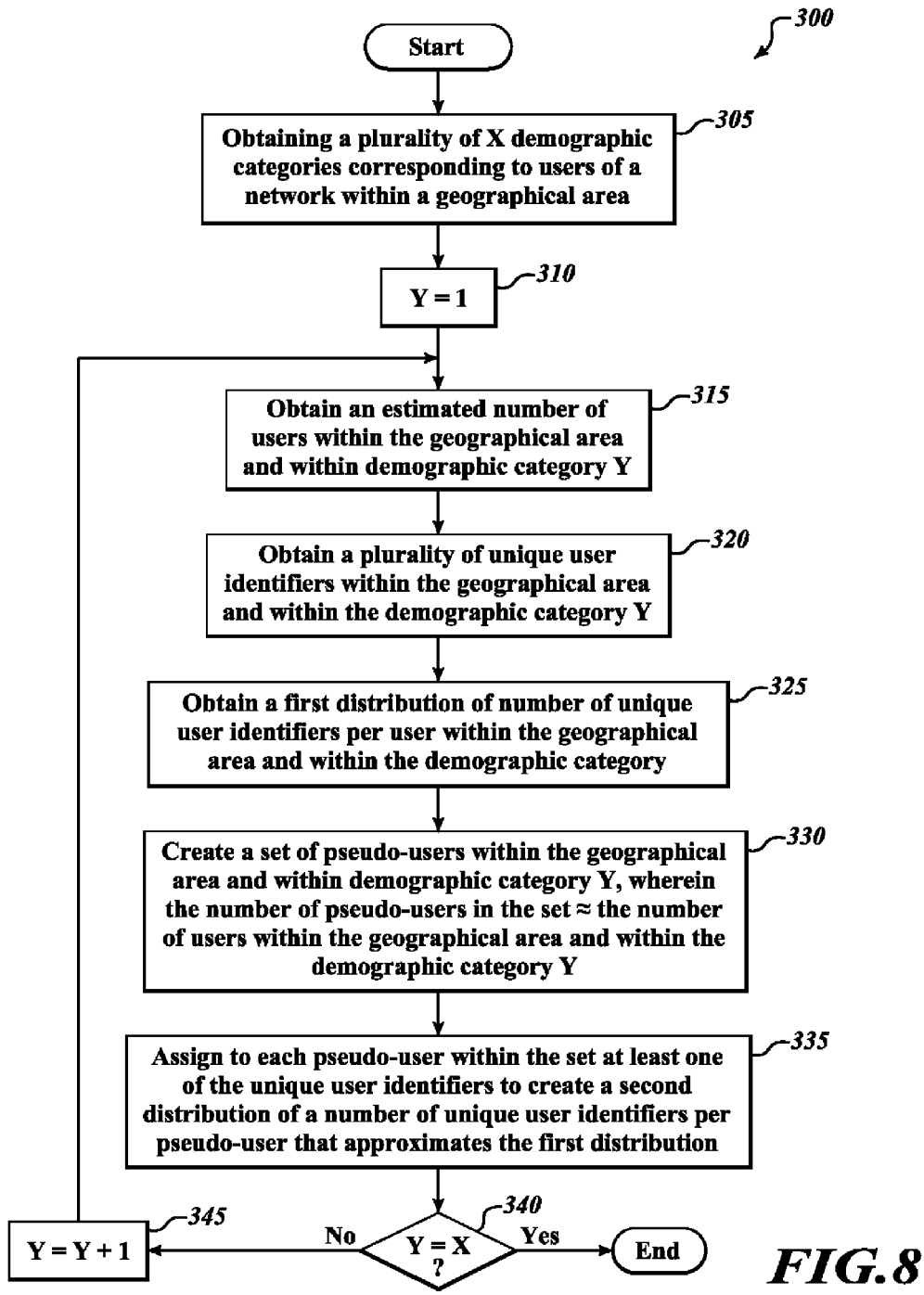
FIG. 8 is a flowchart of an example method of generating a set of pseudo-users for each of a plurality of demographic categories from a geographical area.

Referring now to FIG. 8, a flowchart of an example method 300 of generating a set 140 of pseudo-users 144 for each of a plurality of demographic categories from a geographical area 120 is shown. At step 305, a plurality of "x" demographic categories corresponding to users 122 of a network 102 within the geographical area 120 is obtained, for example, at an estimation server 550. At step 310, a number "y" is set equal to 1. The number "y" corresponds to a specific demographic category of the "x" number of demographic categories. At step 315, an estimated total number of users 122 of the network 102 within the geographical area 120 and within demographic category "y" is obtained, for example, at an estimation server 550. An estimated total number of unique user identifiers 124 within the geographical area 120 and within demographic category "y" is obtained at the estimation server 550, at step 320.

At step 325, a first distribution 160 of number of unique user identifiers 110 per user 104 within the geographical area 120 and the demographic category "y" is obtained by the estimation server 550. The estimation server 550, at step 330, creates a set 140 of pseudo-users 144 within the geographical area 120 and the demographic category "y." The number of pseudo-users 144 within the set 140 is approximately (+/−5-10%) equal to the number of users 104 within the geographical area 120 and within the demographic category "y." At step 335, the estimation server 550, for example, assigns to each pseudo-user 144 within the set 140 at least one of the unique user identifiers 110 within the geographical area 120 and within the demographic category "y" to create a second distribution 165 of a number of unique user identifiers 110 per pseudo-user 144 that approximates the first distribution 160. At step 340, the method determines whether a set 140 of pseudo-users 144 has been created for each demographic category by, for example, determining if "y" is equal to "x." If so, the method 300 ends. If not, the method 300 proceeds to the next demographic category, for example, by incrementing "y" by 1 (i.e., "y"="y"+1) and returns to step 315.

The method 300 can create a set 140 of pseudo-users 144 for each demographic category within a geographical area 120. Further, the equations (2) and (6) described above could be utilized in conjunction with creating and assigning steps 330 and 335. These sets 140 can then be used to determine the estimated number of unique visitors to the network location 106 from the geographical area 120 within the one or more demographic categories.

Figure 9:
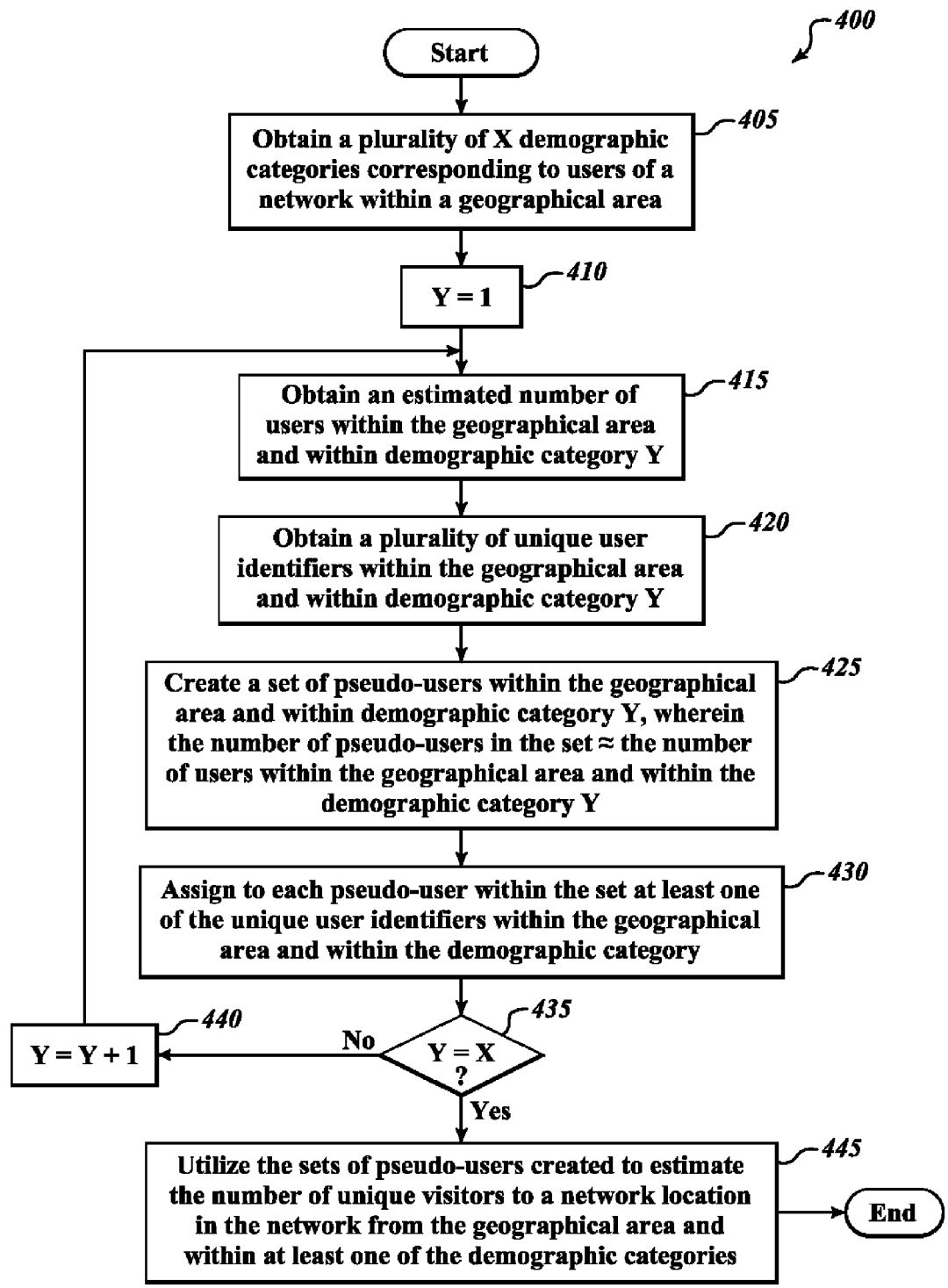
FIG. 9 is a flowchart of an example method of generating a set of pseudo-users for each of a plurality of demographic categories from a geographical area.

Referring now to FIG. 9, a flowchart of an example method 400 of generating a set 140 of pseudo-users 144 for each of a plurality of demographic categories from a geographical area 120 is shown. At step 405, a plurality of "x" demographic categories corresponding to users 122 of a network 102 within the geographical area 120 is obtained, for example, at an estimation server 550. At step 410, a number "y" is set equal to 1. The number "y" corresponds to a specific demographic category of the "x" number of demographic categories. At step 415, an estimated total number of users 122 of the network 102 within the geographical area 120 and within demographic category "y" is obtained, for example, at an estimation server 550. An estimated total number of unique user identifiers 124 within the geographical area 120 and within demographic category "y" is obtained at the estimation server 550, at step 420.

At step 425, the estimation server 550 creates a set 140 of pseudo-users 144 within the geographical area 120 and the demographic category "y." The number of pseudo-users 144 within the set 140 is approximately (+/−5-10%) equal to the number of users 104 within the geographical area 120 and within the demographic category "y." At step 430, the estimation server 550, for example, assigns to each pseudo-user 144 within the set 140 at least one of the unique user identifiers 110 within the geographical area 120 and within the demographic category "y." At step 435, the method determines whether a set 140 of pseudo-users 144 has been created for each demographic category by, for example, determining if "y" is equal to "x." If not, the method 400 proceeds to the next demographic category, for example, by incrementing "y" by 1 (i.e., "y"="y"+1) and returns to step 415.

If, at step 435, it is determined that a set 140 of pseudo-users 144 has been created for each demographic category (by, for example, determining that "y" is equal to "x"), the method 400 proceeds to step 445. At step 445, the estimation server 550 utilizes the sets 140 of pseudo-users 144 that have been created to estimate the number of unique visitors to a network location 106 in the network 102 from within the geographical area 120 and within at least one of the demographic categories. After step 445, the method 400 ends.

The method 400 can create a set 140 of pseudo-users 144 for each demographic category within a geographical area 120. Further, the equations (2) and (6) described above could be utilized in conjunction with creating and assigning steps 425 and 430. These sets 140 can then be used to determine the estimated number of unique visitors to the network location 106 from the geographical area 120 within the one or more demographic categories.

Figure 10:
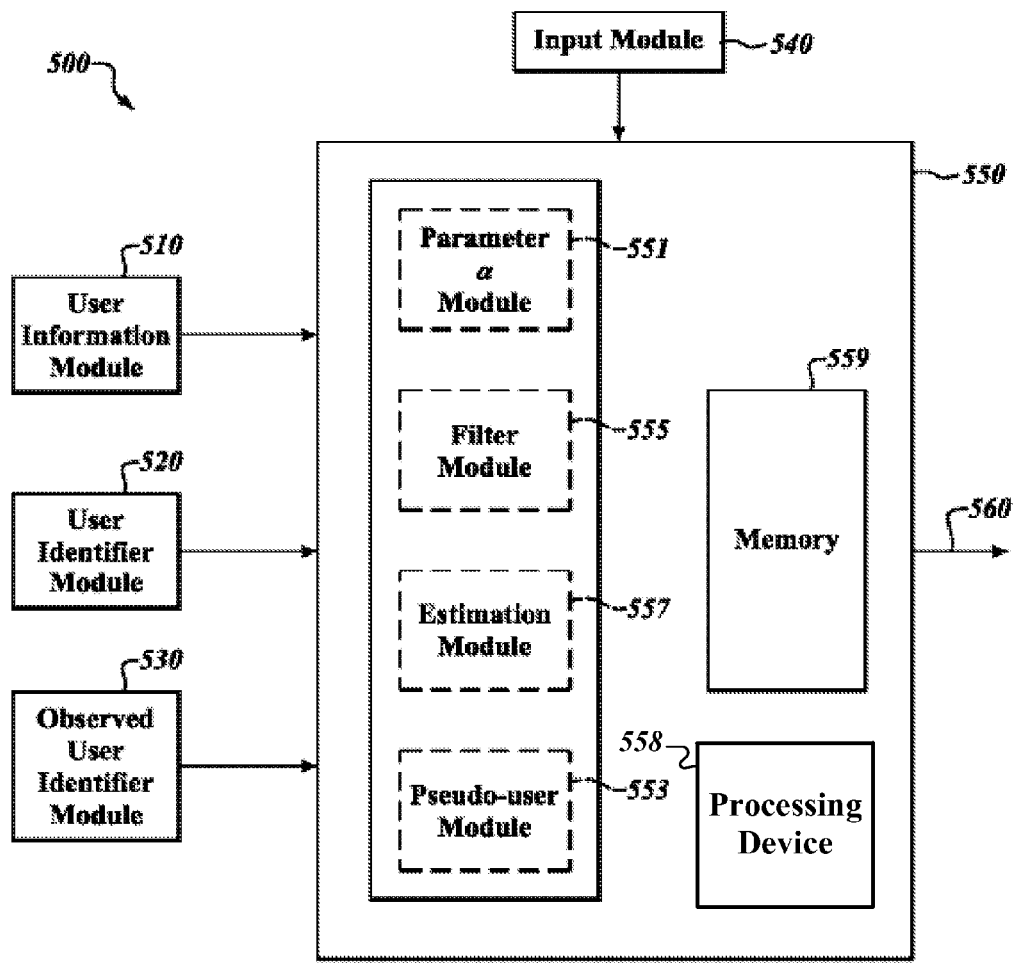
FIG. 10 is a block diagram of an example apparatus for determining the number of unique visitors to a network location in a network.

Referring now to FIG. 10, an example apparatus 500 for implementing the system 100 and methods 200, 300, 400 described above is illustrated. While the apparatus 500 is illustrated as including a plurality of separate modules and components, one skilled in the art will appreciate that some or all of these modules/components can be combined into a single module/component that is configured to perform the tasks described below as being performed by the separate modules/components that are combined.

In some embodiments, the apparatus 500 includes a user information module 510, a user identifier module 520, an observed user identifier module 530, an input module 540 and an estimation server 550. The user information module 510 provides a collection of data, e.g., to the estimation server 550, related to the users 104 of the network 102. For example, the user information module 510 may provide the estimated total number of users 122 of the network 102 within each of the geographical areas 120, as well as demographic information 112 related to the users 104 of the network 102 within each of the geographical areas 120. The collection of data provided by the user information module 510 can be gathered, for example, from voluntary/anonymous browsing data, census data and/or other data sources.

The user identifier module 520 provides a collection of data, e.g., to the estimation server 550, related to the user identifiers 110 belonging to users 104 of the network 102. For example, the user identifier module 520 may provide the estimated total number of unique user identifiers 124 within each of the geographical areas 120, as well as demographic information 112 related to the user identifiers 110 within each of the geographical areas 120. The collection of data provided by the user identifier module 520 can be gathered, for example, from voluntary/anonymous browsing data, census data and/or other data sources.

The observed user identifier module 530 provides a collection of data, e.g., to the estimation server 550, related to the user identifiers 110 observed by at least one of the network locations 106. For example, the observed user identifier module 530 may provide the number and identity of the user identifiers 110 observed at the network location 106 within each of the geographical areas 120, as well as demographic information 112 related to the user identifiers 110 observed at the network location 106 within each of the geographical areas 120. The input module 540 can provide additional inputs, e.g., to the estimation server 550. Examples of these additional inputs include, but are not limited to, requests for estimation information, information related to the value of the parameters α for one or more geographical areas 120, information related to the value of the parameter β, and information related to the identification of aberrant unique user identifiers.

The estimation server 550 can include a parameter α module 551, an estimation module 553, a pseudo-user module 555, a filter module 557, a processing device 558 and a memory 559. All of these components 551-559 are configured to receive data/information generated by any one of these components 551-559, as well the data provided to the estimation server 550 by the user information module 510, the user identifier module 520, the observed user identifier module 530, and the input module 540. The processing device 558 can include one or more processors configured to execute the functions of the estimation server 550, such as those described in relation to the parameter α module 551, the estimation module 553, the pseudo-user module 555, the filter module 557. It should be appreciated that any one or more of these modules can be executed in whole or in part by the processing device 558. Information provided to, or generated by, the estimation server 550 can be stored in memory 559 and/or output, e.g., to another computing device.

The parameter α module 551 includes values for the parameter α 126 for each of the geographical areas 120 and/or can determine a value for the parameter α 126 based on the non-linear approximation described above. The pseudo-user module 553 can generate a set 140 of pseudo-users 144 for each of a plurality of demographic categories, e.g., based on the methods described above in regard to FIGS. 8-9. In some embodiments, the filter module 555 can filter the data received from the user information module 510, user identifier module 520, observed user identifier module 530 and/or input module 540 to remove the aberrant users 104 and/or aberrant unique user identifiers 110 before creation of the sets 140 of pseudo-users 144 by the pseudo-user module 553, as described above.

The estimation module 553 can determine an estimated number of unique visitors to a network location 106 based on information/data received from the user information module 510, user identifier module 520, observed user identifier module 530 and/or input module 540, e.g., by performance of the methods 200, 300, 400 described above. The estimation module 553 can provide an estimated number of unique visitors to a network location 106 from each (or a combination) of a plurality of geographical areas 120. Further, the estimation module 553 can provide an estimated number of unique visitors to a network location 106 within each (or a combination) of a plurality of demographic categories.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
obtaining, at an estimation server, an estimated number of users of a network within a geographical area;
obtaining, at the estimation server, an estimated number of unique user identifiers within the geographical area;
obtaining, at the estimation server, a number of unique user identifiers from the geographical area that are observed at a network location in the network;
determining, at the estimation server, an estimated number of unique visitors to the network location from the geographical area utilizing a non-linear approximation based on at least the estimated number of users within the geographical area, the estimated number of unique user identifiers within the geographical area, and the number of unique user identifiers from the geographical area that are observed at the network location; and
storing, on a memory at the estimation server, the estimated number of unique visitors to the network location from the geographical area, wherein the non-linear approximation comprises:

$$\# \text{ people} = \frac{(1+\alpha)\# \text{ cookies}}{\alpha c + \# \text{ cookies}} \cdot p;$$

wherein "# people" is the estimated number of unique visitors to the network location from the geographical area; "# cookies" is the number of unique user identifiers from the geographical area that are observed at the network location; "c" is the estimated number of unique user identifiers within the geographical area; "p" is the estimated number of users within the geographical area; and "α" is a parameter specific to the geographical area.

2. The method of claim 1, wherein the unique user identifiers comprise cookies.

3. The method of claim 1, wherein α is determined from a virtual panel of users from the geographical area.

4. The method of claim 1, wherein α is determined from a non-linear approximation comprising:

$$\alpha = \frac{1}{(c/p)^\beta - 1};$$

wherein "c" is the estimated number of unique user identifiers within the geographical area; "p" is the estimated number of users within the geographical area; and "β" is a parameter independent of the geographical area that is determined from a virtual panel of users.

5. The method of claim 4, wherein β equals 0.9.

6. The method of claim 1, wherein the unique user identifiers comprise cookies.

7. A system, comprising: one or more processors at an estimation server operable to perform operations comprising:
obtaining an estimated number of users of a network within a geographical area;
obtaining an estimated number of unique user identifiers within the geographical area;
obtaining a number of unique user identifiers from the geographical area that are observed at a network location in the network;
determining an estimated number of unique visitors to the network location from the geographical area utilizing a non-linear approximation based on at least the estimated number of users within the geographical area, the estimated number of unique user identifiers within the geographical area, and the number of unique user identifiers from the geographical area that are observed at the network location; and storing, on a memory at the estimation server, the estimated number of unique visitors to the network location from the geographical area, wherein the non-linear approximation comprises:

$$\# \text{ people} = \frac{(1+\alpha)\# \text{ cookies}}{\alpha c + \# \text{ cookies}} \cdot p;$$

wherein "# people" is the estimated number of unique visitors to the network location from the geographical area; "# cookies" is the number of unique user identifiers from the geographical area that are observed at the network location; "c" is the estimated number of unique user identifiers within the geographical area; "p" is the estimated number of users within the geographical area; and "α" is a parameter specific to the geographical area.

8. The system of claim 7, wherein the unique user identifiers comprise cookies.

9. The system of claim 7, wherein α is determined from a virtual panel of users from the geographical area.

10. The system of claim 7, wherein α is determined from a non-linear approximation comprising:

$$\alpha = \frac{1}{(c/p)^\beta - 1};$$

wherein "c" is the estimated number of unique user identifiers within the geographical area; "p" is the estimated number of users within the geographical area; and "β" is a parameter independent of the geographical area that is determined from a virtual panel of users.

11. The system of claim 10, wherein β equals 0.9.

12. The system of claim 7, wherein the unique user identifiers comprise cookies.

13. A method comprising:
obtaining, at an estimation server, a plurality of demographic categories corresponding to users of a network within a geographical area; and
for at least one demographic category of the plurality of demographic categories:
(1) obtaining, at the estimation server, an estimated number of users within the geographical area and within the demographic category;
(2) obtaining, at the estimation server, an estimated number of unique user identifiers within the geographical area and within the demographic category;
(3) obtaining, at the estimation server, a number of unique user identifiers from the geographical area and within the demographic category that are observed at a network location in the network;
(4) determining, at the estimation server, an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location; and
(5) storing, on a memory at the estimation server, the estimated number of unique visitors to the network location from the geographical area, wherein the non-linear approximation comprises:

$$\# \text{ people} = \frac{(1+\alpha)\# \text{ cookies}}{\alpha c + \# \text{ cookies}} \cdot p;$$

wherein "# people" is the estimated number of unique visitors to the network location from the geographical area and within the demographic category; "# cookies" is the number of unique user identifiers from the geographical area and within the demographic category that are observed at the network location; "c" is the estimated number of unique user identifiers within the geographical area and within the demographic category; "p" is the estimated number of users within the geographical area and within the demographic category; and "α" is a parameter specific to the geographical area.

14. The method of claim 13, wherein the unique user identifiers comprise cookies.

15. The method of claim 13, wherein α is determined from a virtual panel of users from the geographical area.

16. The method of claim 13, wherein α is determined from a non-linear approximation comprising:

$$\alpha = \frac{1}{(c/p)^\beta - 1};$$

wherein "c" is the estimated number of unique user identifiers within the geographical area; "p" is the estimated number of users within the geographical area; and "β" is a parameter independent of the geographical area that is determined from a virtual panel of users.

17. The method of claim 16, wherein β equals 0.9.

18. The method of claim 13, wherein the unique user identifiers comprise cookies.

19. The method of claim 13, further comprising, for each remaining demographic category of the plurality of demographic categories:
(1) obtaining, at the estimation server, an estimated number of users within the geographical area and within the demographic category;
(2) obtaining, at the estimation server, an estimated number of unique user identifiers within the geographical area and within the demographic category;
(3) obtaining, at the estimation server, a number of unique user identifiers from the geographical area and within the demographic category that are observed at a network location in the network; and
(4) determining, at the estimation server, an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location.

20. The method of claim 19, further comprising determining, at the estimation server, a total estimated number of unique visitors to the network location from the geographical area by summing the estimated number of unique visitors to the network location from each remaining demographic category of the plurality of demographic categories and from the geographical area.

21. The method of claim 20, wherein the non-linear approximation comprises:

$$\text{\# people} = \frac{(1+\alpha)\text{\# cookies}}{\alpha c + \text{\# cookies}} \cdot p;$$

wherein "# people" is the estimated number of unique visitors to the network location from the geographical area and within the demographic category; "# cookies" is the number of unique user identifiers from the geographical area and within the demographic category that are observed at the network location; "c" is the estimated number of unique user identifiers within the geographical area and within the demographic category; "p" is the estimated number of users within the geographical area and within the demographic category; and "α" is a parameter specific to the geographical area.

22. The method of claim 21, wherein the unique user identifiers comprise cookies.

23. The method of claim 21, wherein α is determined from a virtual panel of users from the geographical area.

24. The method of claim 21, wherein α is determined from a non-linear approximation comprising:

$$\alpha = \frac{1}{(c/p)^\beta - 1};$$

wherein "c" is the estimated number of unique user identifiers within the geographical area; "p" is the estimated number of users within the geographical area; and "β" is a parameter independent of the geographical area that is determined from a virtual panel of users.

25. The method of claim 24, wherein β equals 0.9.

26. The method of claim 20, wherein the unique user identifiers comprise cookies.

27. A system, comprising: one or more processors at an estimation server operable to perform operations comprising:
obtaining a plurality of demographic categories corresponding to users of a network within a geographical area; and
for at least one demographic category of the plurality of demographic categories:
(1) obtaining an estimated number of users within the geographical area and within the demographic category;
(2) obtaining an estimated number of unique user identifiers within the geographical area and within the demographic category;
(3) obtaining a number of unique user identifiers from the geographical area and within the demographic category that are observed at a network location in the network;
(4) determining an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location; and
(5) storing on a memory at the estimation server the estimated number of unique visitors to the network location from the geographical area, wherein the non-linear approximation comprises:

$$\text{\# people} = \frac{(1+\alpha)\text{\# cookies}}{\alpha c + \text{\# cookies}} \cdot p;$$

wherein "# people" is the estimated number of unique visitors to the network location from the geographical area and within the demographic category; "# cookies" is the number of unique user identifiers from the geographical area and within the demographic category that are observed at the network location; "c" is the estimated number of unique user identifiers within the geographical area and within the demographic category; "p" is the estimated number of users within the geographical area and within the demographic category; and "α" is a parameter specific to the geographical area.

28. The system of claim 27, wherein the unique user identifiers comprise cookies.

29. The system of claim 27, wherein α is determined from a virtual panel of users from the geographical area.

30. The system of claim 27, wherein α is determined from a non-linear approximation comprising:

$$\alpha = \frac{1}{(c/p)^\beta - 1};$$

wherein "c" is the estimated number of unique user identifiers within the geographical area; "p" is the estimated number of users within the geographical area; and "β" is a parameter independent of the geographical area that is determined from a virtual panel of users.

31. The system of claim 30, wherein β equals 0.9.

32. The system of claim 27, wherein the unique user identifiers comprise cookies.

33. The system of claim 27, wherein the operations further comprise, for each remaining demographic category of the plurality of demographic categories:
(1) obtaining an estimated number of users within the geographical area and within the demographic category;
(2) obtaining an estimated number of unique user identifiers within the geographical area and within the demographic category;
(3) obtaining a number of unique user identifiers from the geographical area and within the demographic category that are observed at a network location in the network; and
(4) determining an estimated number of unique visitors to the network location from the geographical area and within the demographic category utilizing a non-linear approximation based on at least the estimated number of users within the geographical area and within the demographic category, the estimated number of unique user identifiers within the geographical area and within the demographic category, and the number of unique user identifiers from the geographical area and within the demographic category that are observed at the network location.

34. The system of claim 33, wherein the operations further comprise determining a total estimated number of unique visitors to the network location from the geographical area by summing the estimated number of unique visitors to the network location from each remaining demographic category of the plurality of demographic categories and from the geographical area.

35. The system of claim 34, wherein the non-linear approximation comprises:

$$\text{\# people} = \frac{(1+\alpha)\text{\# cookies}}{\alpha c + \text{\# cookies}} \cdot p;$$

wherein "# people" is the estimated number of unique visitors to the network location from the geographical area and within the demographic category; "# cookies" is the number of unique user identifiers from the geographical area and within the demographic category that are observed at the network location; "c" is the estimated number of unique user identifiers within the geographical area and within the demographic category; "p" is the estimated number of users within the geographical area and within the demographic category; and "α" is a parameter specific to the geographical area.

36. The system of claim 35, wherein the unique user identifiers comprise cookies.

37. The system of claim 35, wherein α is determined from a virtual panel of users from the geographical area.

38. The system of claim 35, wherein α is determined from a non-linear approximation comprising:

$$\alpha = \frac{1}{(c/p)^\beta - 1};$$

wherein "c" is the estimated number of unique user identifiers within the geographical area; "p" is the estimated number of users within the geographical area; and "β" is a parameter independent of the geographical area that is determined from a virtual panel of users.

39. The system of claim 38, wherein β equals 0.9.

40. The system of claim 34, wherein the unique user identifiers comprise cookies.

* * * * *

UNITED STATES PATENT AND TRADEMARK OFFICE
CERTIFICATE OF CORRECTION

PATENT NO.        : 9,313,113 B2
APPLICATION NO.   : 14/050569
DATED             : April 12, 2016
INVENTOR(S)       : Evgeny Skvortsov et al.

Page 1 of 1

It is certified that error appears in the above-identified patent and that said Letters Patent is hereby corrected as shown below:

On the title page, item (54) and in the specification, column 1, line 1, delete "VISTORS" and insert -- VISITORS --

Signed and Sealed this
Fifth Day of July, 2016

Michelle K. Lee
*Director of the United States Patent and Trademark Office*